US011258298B2

(12) United States Patent
Motsenbocker

(10) Patent No.: US 11,258,298 B2
(45) Date of Patent: Feb. 22, 2022

(54) SOLAR POWERED OFFICE AND FACTORY LIGHTING

(71) Applicant: Marvin Motsenbocker, Kamijima cho (JP)

(72) Inventor: Marvin Motsenbocker, Kamijima cho (JP)

(*) Notice: Subject to any disclaimer, the term of this patent is extended or adjusted under 35 U.S.C. 154(b) by 0 days.

(21) Appl. No.: 16/932,750

(22) Filed: Jul. 18, 2020

(65) Prior Publication Data

US 2021/0021151 A1    Jan. 21, 2021

Related U.S. Application Data

(60) Provisional application No. 62/959,899, filed on Jan. 11, 2020, provisional application No. 62/959,202, filed on Jan. 10, 2020, provisional application No. 62/927,101, filed on Oct. 28, 2019, provisional application No. 62/875,992, filed on Jul. 19, 2019.

(51) Int. Cl.
| | |
|---|---|
| *H02J 3/38* | (2006.01) |
| *H02J 9/06* | (2006.01) |
| *H05B 45/37* | (2020.01) |
| *H05B 45/3725* | (2020.01) |
| *H05B 45/325* | (2020.01) |
| *H05B 45/46* | (2020.01) |
| *F25B 27/00* | (2006.01) |
| *H05B 45/14* | (2020.01) |
| *H02J 7/35* | (2006.01) |

(52) U.S. Cl.
CPC ............ *H02J 9/065* (2013.01); *F25B 27/005* (2013.01); *H02J 3/381* (2013.01); *H05B 45/14* (2020.01); *H05B 45/325* (2020.01); *H05B 45/3725* (2020.01); *H05B 45/46* (2020.01); *H02J 7/35* (2013.01); *H02J 2300/26* (2020.01)

(58) Field of Classification Search
CPC .. H02J 3/381; H02J 3/383; H02J 3/385; H02J 7/35; H02J 9/04; H02J 9/065; H02J 2300/26; H02J 3/38; H02J 9/06; H02H 7/20; H05B 45/325; H05B 45/37; H05B 45/3725; H05B 45/375; H05B 45/38; H05B 45/385
See application file for complete search history.

(56) References Cited

U.S. PATENT DOCUMENTS

| | | | | |
|---|---|---|---|---|
| 2012/0035871 A1* | 2/2012 | Cofta | ................... | H04L 63/0428 702/62 |
| 2012/0205974 A1* | 8/2012 | McCaslin | ............... | H02J 3/381 307/18 |
| 2016/0219664 A1* | 7/2016 | Ellenberger | ........... | H05B 45/10 |
| 2018/0034268 A1* | 2/2018 | Motsenbocker | .......... | H02J 1/08 |
| 2019/0074695 A1* | 3/2019 | Motsenbocker | .......... | H02J 9/04 |

* cited by examiner

*Primary Examiner* — Thai Pham

(57) ABSTRACT

Reliability of devices such as lighting fixtures, is improved by replacing an inductor based voltage inverter to power the device with a switching constant current PWM controller. Avoiding use of an inductor and matching capacitor is made possible by a high voltage power input that exceeds the voltage requirements of the device. The power is pulse width modulated with a current feedback to control duty cycle, and thus average device current.

19 Claims, 10 Drawing Sheets

SOLAR POWERED OFFICE AND FACTORY LIGHTING

RELATED U.S. APPLICATION DATA

Provisional application No. 62/875,992 filed on Jul. 19, 2019.
Provisional application No. 62/927,101 filed on Oct. 28, 2019.
Provisional application No. 62/959,202 filed on Jan. 10, 2020.
Provisional application No. 62/959,899 filed on Jan. 11, 2020.
The contents of these priority applications are incorporated by reference in their entireties.

BACKGROUND

LED ("light emitting diode) technology generally uses inductors and capacitors in circuits to change voltage for powering LED light fixtures. These voltage changing circuits incur manufacturing cost, lose power as waste heat, and have a finite lifetime due to component failure, which incurs further maintenance costs due to their necessary replacement. Thus, LED lighting, while more efficient than incandescent lighting, has extra costs and efficiency issues from conversion circuits that are often supplied integrated into bulbs or attached as boxes to LED light fixtures.

See FIG. 1, which shows a typical prior art installation of lighting circuit 10 controlled by switch 12 to accept power 13. Each LED light fixture has a power converter 15 electrically connected to convert high voltage (greater or equal to 100 volts) to a group of LEDs.

Power inverter 15 passes power through an inductor (typically in "buck," "buck-boost" or "flyback" circuit configuration) and often converts AC ("alternating current") to DC ("direct current"). All inverters lose energy as heat, which is shown in the drawing as heat waves emanating from each inverter. This inefficiency further increases costs by requiring sufficient heat sinking to dissipate the wasted energy and cause circuit failure, prompting more frequent replacement of fixtures.

Long LED bulb lifetimes often are not realized because the connected buck/boost inverter burns out due to high demand on an electrolytic capacitor through which current has to flow. This greatly shortens lifetime of the light fixture, which often has to be replaced within a few years.

SUMMARY

Circuits, processes and their implementation alleviate the disadvantages described above and provide lower cost lighting, particularly for factories and offices. These devices and strategies increase EROI (energy return on investment) of solar electric power and can help usher in a new age of renewable energy.

An embodiment provides a solar powered lighting circuit that distributes solar electric energy to multiple light emitting diodes without significant voltage change or control via inductive voltage boosting or bucking, comprising: a source of solar electric power; and a controller with an input connected to the source of solar electric power and an output connected to one or more light emitting diodes, a voltage feed-forward control that adjusts load at the input based on sensing input voltage, and a current feedback control that adjusts current to the output based on sensing the output current.

In an embodiment the source of solar electric power is a set of solar panels connected at least in series to produce a voltage that is between 0 and 25 volts higher than that supplied to a series of light emitting diodes connected to the controller output. An embodiment further comprises a source of backup power that is connected in parallel with power obtained from the solar electric power and that supplies increasing amount of power to the load when the solar electric energy decreases below the amount to fully supply the LEDs. An embodiment further comprises a PWM control for a lower priority load, wherein the PWM monitors the solar power voltage and modulates the lower priority load based on the monitored solar power voltage to prevent overloading the solar power. In an embodiment the further comprised PWM control is a microprocessor or a PWM controller chip. In an embodiment the one or more light emitting diodes are multiple, independent lighting fixtures, and wherein the independent lighting fixtures lack an inductor for changing current or voltage applied to their respective light emitting diodes.

An embodiment provides a lighting system for using renewable power to power multiple LED lighting fixtures, comprising: a source of renewable DC power; multiple LED lighting fixtures electrically connected in series and electrically connected to the source of renewable power via a current feedback controller; wherein the current feedback controller senses output current to a constant direct current load and adjusts average current supplied to the load by adjusting duty cycle of power output from the converter, wherein no inductor based voltage control is used between the output of the renewable power and the lighting fixtures, and wherein a backup power source is connected in parallel with the source of renewable power such that as renewable power voltage drops below a threshold voltage, the backup power automatically supplants the renewable power source as the voltage approaches the threshold voltage. In an embodiment the converter comprises a microprocessor or PWM controller inside an enclosure but lack a buck or boost inverter that uses an inductor to modify voltage or current. In an embodiment the enclosure has inputs for the source of solar power input, and a backup power, and an output suitable for a string of light fixtures.

An embodiment provides a light that connects to a source of high voltage power, comprising: multiple light emitting diodes electrically connected to accept a direct current power at a voltage less than the voltage of the high voltage power; a PWM circuit that accepts the high voltage power as an input and generates a pulsed direct current output of a defined average constant current to the multiple light emitting diodes; and a low voltage power converter that accepts the high voltage power as an input and generates a low voltage power to the PWM circuit; wherein the power supplied to the multiple light emitting diodes does not pass through an inductor. In an embodiment less than 1% of the current supplied to the multiple light emitting diodes passes through an electrolytic capacitor. In an embodiment the PWM circuit and the low voltage power converter are housed separately from the light emitting diodes and are electrically connected between the high voltage power and the multiple light emitting diodes. In an embodiment the PWM circuit and the low voltage power converter are housed together with the light emitting diodes in a light fixture. In an embodiment the PWM circuit comprises a dedicated chip that generates a variable duty cycle on-off signal to a switching transistor. In an embodiment the light further comprises a current sensor that senses current flow into the LEDs, wherein the current sensor is a resistor in series with the LED current and is less than 0.5 ohms. In an embodiment the low voltage power converter comprises a dedicated buck controller inverter chip. In an embodiment the low voltage power converter comprises a silicon controlled rectifier that creates a low voltage without pulsing current through an inductor.

An embodiment provides a lighting system that combines solar electric power with utility power at a high voltage, comprising: a. a light comprising multiple light emitting diodes electrically connected to accept a direct current power at a voltage less than the high voltage; a PWM circuit that accepts rectified high voltage as an input and generates a pulsed direct current output of a defined average constant current to the multiple light emitting diodes; a low voltage power converter that accepts the high voltage as an input and generates a low voltage power to the PWM circuit; a parallel connection to a second DC input, and b: a set of solar panels connected to the second DC input so as to provide a DC voltage higher than the utility power RMS voltage, wherein the output of the set of solar panels is supplemented by the utility power. In an embodiment the high voltage supplied to the multiple light emitting diodes does not pass through an inductor. In an embodiment the high voltage power is 220 volts AC. In an embodiment the solar panels are connected by a blocking diode to the parallel connection and a capacitor of at least 10 uF is attached to the solar panels output. In an embodiment the PWM circuit outputs a signal periodicity of greater than two kilohertz.

In an embodiment the PWM circuit outputs a signal periodicity of less than ten kilohertz. In an embodiment the solar panel power is not converted to a different voltage before the parallel connection. In an embodiment the high voltage is between 100 and 125 volts. In an embodiment the solar panel output voltage is more than 10 volts higher than the utility RMS voltage.

DETAILED DESCRIPTION

Avoid wasteful voltage changes from passing power through inductors. Techniques and apparatuses were surprisingly discovered that allowed solar electric energy to power regular 110V equipment (in Japan and the U.S.) and regular 220V equipment (in Africa and other regions) such as LED lights without pulsing current through an inductor based voltage converter circuit in the equipment. Instead of using expensive, power robbing voltage changes (such as in a circuit at each light fixture), a single non-inductive PWM controller, preferably at a user operated switch, controls series-connected LED fixtures on a common circuit with high efficiency.

Figure 2:
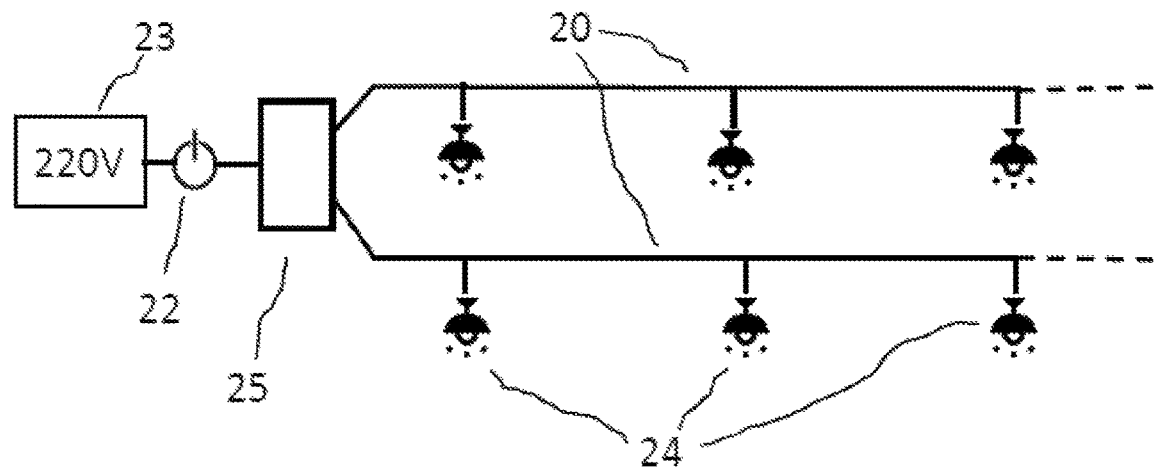
FIG. 2 illustrates an embodiment for powering a string of LED lighting fixtures from a single controller without changing voltage.

A basic configuration in FIG. 2, shows LED fixture circuit strings 20 connected to controller 25. Power 23 is shown as 220 volts, and while 200-300 volts (AC or DC) is a preferred range, other higher voltages such as 380 volts DC or 440 volts AC are particularly desirable. Power from 23 is PWM ("pulse width modulated") controlled by controller 25 to a set average current for each LED fixture 24 in one or more strings 20. Two strings, each having a target average current level established by PWM control, are shown. Switch 22 is indicated between input power 23 and PWM controller 15 but can be at another position such as between controller 25 and light string(s) 20.

Unexpected Advantages for Combination with Solar Electric

Figure 3:
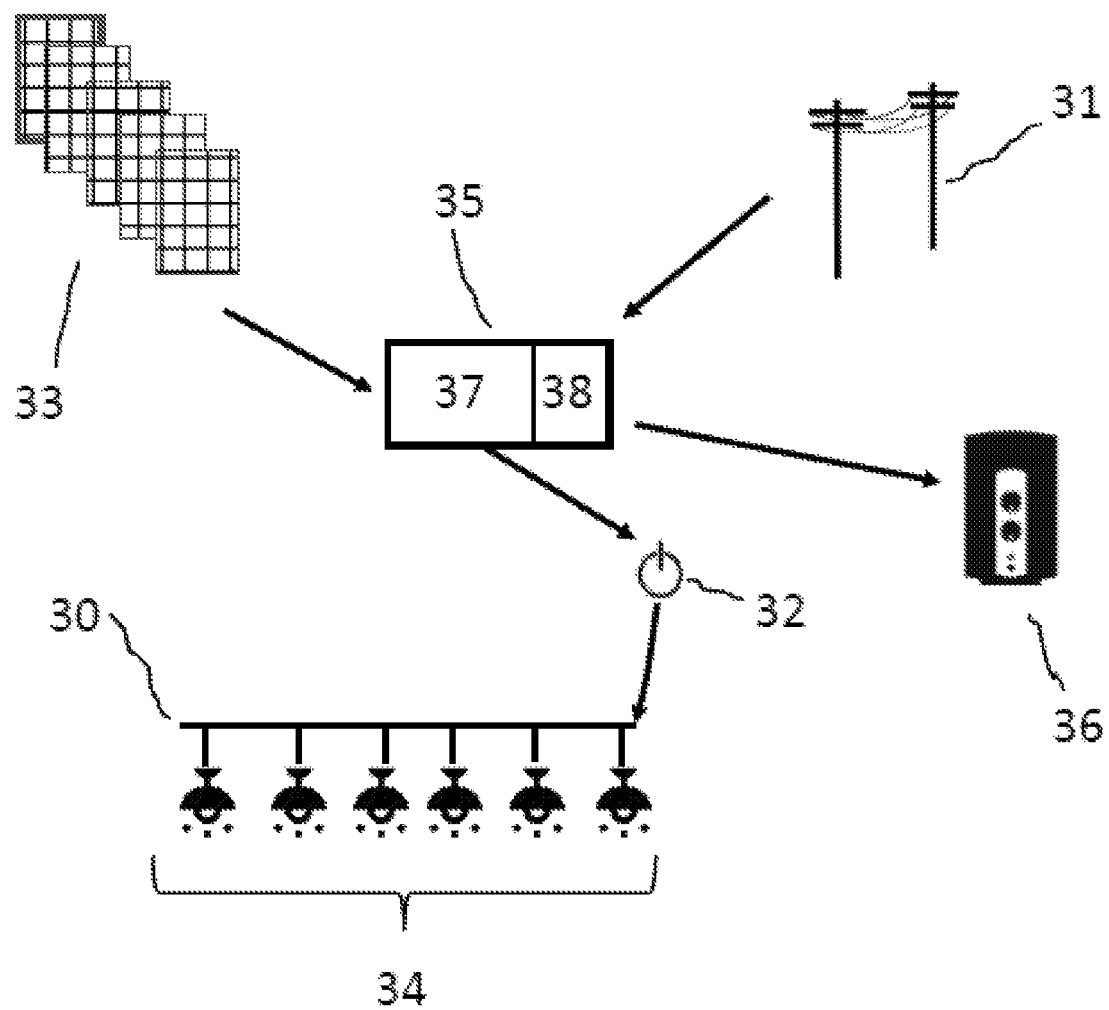
FIG. 3 shows an embodiment for combining backup power and an optional embodiment for combining lower priority loads.

Solar electric preferably connects directly (or less preferably indirectly after voltage adjustment or MPPT adjustment of the provided solar power) to the apparatus shown in FIG. 2. FIG. 3 shows supply of solar panel power 33 to controller 35. Controller 35 sets an average current via control of pulse width to series connected string 30 of the group of LED light fixtures 34.

By supplying solar panel sourced power at a voltage at or above the voltage needed by the LED string (but preferably less than 50% higher than that needed), the solar energy does not have to undergo regular voltage change by an inductor based buck, buck-boost, or flyback circuit configuration. This directly increases EROI by decreasing capital investment spending on solar energy, increasing the amount of useful energy returned from the solar energy investment, and decreasing long term costs needed for equipment replacement.

Preferably, solar panels are combined in series and parallel configurations to provide voltages at or above the intended use voltage (taking into account the voltage drop due to high temperatures). Then the outputted solar power is interrupted at variable duty cycle to accommodate different set average current loads. In a preferred embodiment backup grid power or a battery is connected in a simple (parallel connection) manner, while relying on Kirchoff's laws for auto-regulation. Outside utility power 31 or battery power can be smoothly added as needed to supplement solar energy as sunshine intensity wavers. This eliminates or minimizes conversion circuits to merge the two power sources, decreases cost, and increases energy efficiency for a higher EROI.

A circuit within controller 35 preferably monitors output current but optionally monitors input voltage of solar panel power to optimize solar panel loading via MPPT or feed forward voltage control. Duty cycle (percent on time) of the pulse width modulated power to the LED string and to other optionally connected devices is adjusted as needed to regulate average output current.

This control of constant average load current can be carried out several ways, as a skilled artisan will appreciate. For mass production, a programmable microcontroller with PWM capability and having at least one comparator, that outputs a varying duration pulse (for duty cycle of applied power to the output) to a semiconductor switch is preferred.

Figure 4:
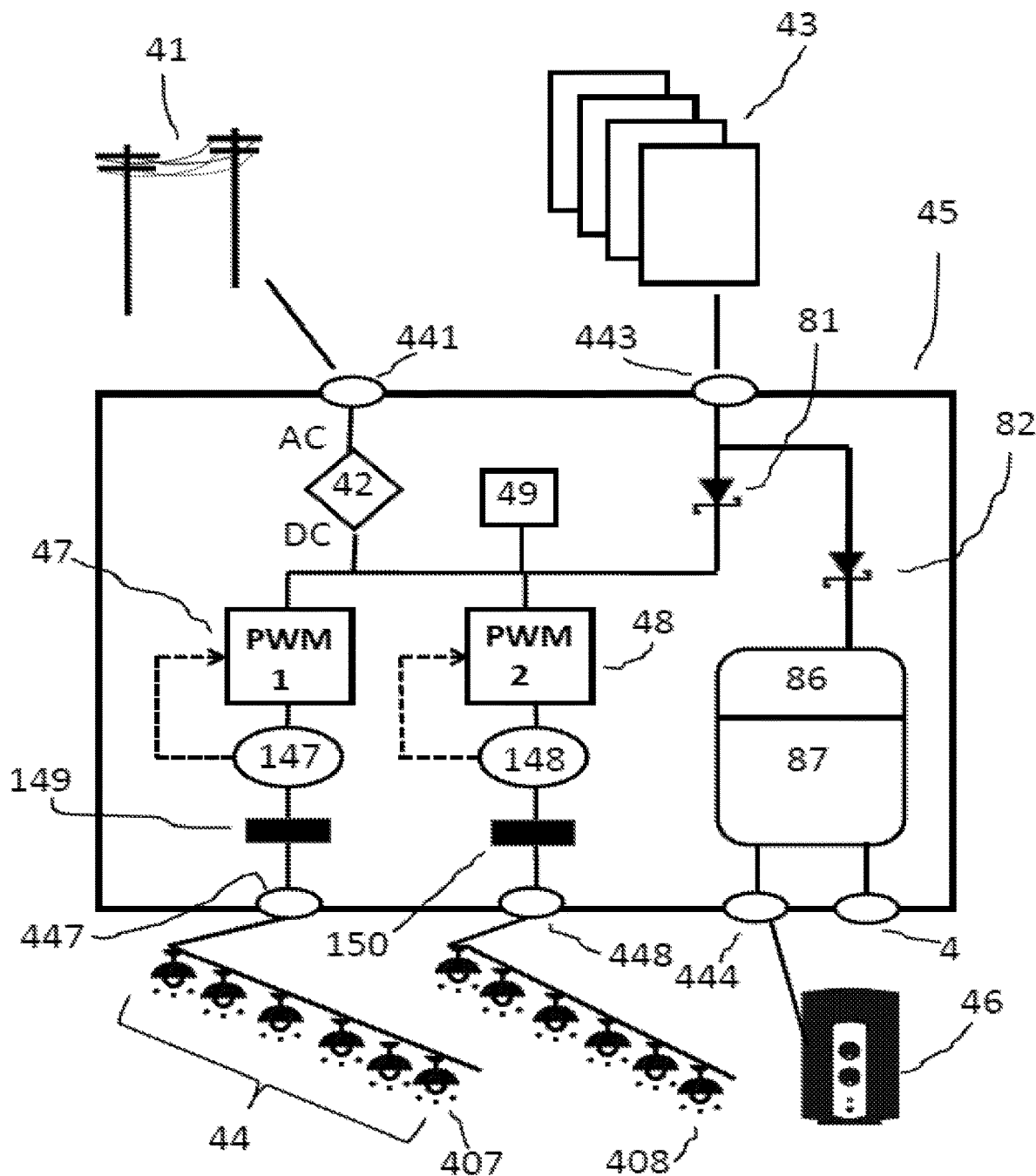
FIG. 4 shows details of an apparatus with optional embodiment for combining lower priority loads for increased EROI ("Energy Returned On Investment.")

Generally, average current flow to an LED load is monitored and a current sense signal is obtained and used to adjust duty cycle by comparison with a stored reference. Duty cycle (percent switch on time) is increased to increase average current and duty cycle is decreased to cause a lower average current. A sensed current signal preferably is compared with a reference or stored value to make the determination for duty cycle, to target the desired output level. In a preferred embodiment, an error amplifier works with a comparator to compare the current sense signal from current sensor 147 (148), with a reference voltage to make the comparison, as shown in FIG. 4.

Also see FIG. 3, which shows control circuit 35 that provides current regulated power to LED light strings 30. Portion 37 of control circuit 35 is a constant current feedback circuit. By controlling current to the string, each light in the string receives the same amount of current. In an embodiment, each LED light fixture comprises a large number of individual LEDs, uses no inductor based voltage booster or bucker, and may include circuitry to more uniformly distribute current between the individual LEDs. Preferably, the LED light does not boost or buck the voltage supplied by circuit 35 but merely accepts the output.

Importantly no significant voltage change or control occurs via inductive voltage boosting or bucking. The term "no significant voltage change or control" in this context means that little or no current passes through a voltage controller and that less than 10% of power, more preferably less than 5% of power and most preferably no power is voltage adjusted by using for example an inductor based buck, buck boost, or flyback inverter.

"Average current flow" refers to sensing current to a load over a short time period in view that the temperature dissipation characteristic of LEDs allows short pulses at higher current, which averages out to a lower current commensurate with a longer time constant that characterizes the heat dissipation. Preferably a time constant for adjusting average current using a current sensor is at least 10 milliseconds and in some cases more than 50 milliseconds or even over 200 milliseconds. In an embodiment, a PWM operates at for example a 500 hertz interrupt rate. In this example at least two duty cycles occupy 40 milliseconds and a minimum acceptable time constant is twice the interrupt time, such as between 40 and 100 milliseconds.

A wide variety of current sensors may be used. Measuring voltage drop across a small series resistor of 0.1 ohms, 0.01 ohms or the like was used with high reliability and is preferred for its simplicity. A hall effect sensor is preferred when part prices are low enough.

The limit of response time in an embodiment generally is the heating time of an LED, based on the heat sink and the current pulse strength. Higher but short duration current pulses are acceptable if LED's do not heat up between pulses to a level that appreciably shortens their life time. Without wishing to be bound by any one theory of this embodiment, it is suggested that LEDs are primarily destroyed by overheating and PWM control of current allows limited higher current at short pulses, which average out to the same heating effect as lower constant current at the average measured value.

In an embodiment, solar electric power is a sole energy source and a feed forward input voltage control or MPPT controller prevents overloading the solar panels when their power output is insufficient to drive the load. Otherwise a high load and cloudy condition drops their voltage below a desired level. More preferably however, utility power backup 31 (FIG. 3) is connected in parallel and prevents voltage drop to the load when sunshine drops. In a preferred embodiment, a feed forward input voltage control circuit and/or feed back output current control circuit 37 are implemented in a single processor or a PWM chip that uses two respective error amps and a comparator to adjust duty cycle of power output to LED light string 30.

In an embodiment (FIG. 3) if insufficient solar energy is available, current can be decreased to dim lights 34, and/or one or more other loads 36 can be shed. For example one or more strings of lights can be sacrificed by turning off or dimming to preserve power to accommodate decreased solar availability (sensed by, for example change in signal from light sensor, or decreased voltage from solar panels with a constant load). Also, a lower priority loads such as heater 36 that shares the solar power can be turned off or receive decreased power flow. This prioritization can be implemented by turning off a low priority load when a minimum solar input voltage is detected by circuit 35. Likewise, when the solar input voltage rises above a threshold value, a lower priority load can be added. To accommodate a solar energy only condition (or to respond to a cut off in backup power 31), controller 35 has a solar power voltage or power monitor circuit portion 37, which alters loading of solar panels 33 by modulating the duty cycle of the connection to panels 33. Similarly, portion 38 responds to a changing solar power availability from panels 33 by modulating power flow to lower priority load 36 by decreasing duty cycle of that load connection when solar power decreases.

Backup DC power connected in parallel Preferably a backup DC power source such as rectified DC from an AC utility line or a battery is connected in parallel as shown more specifically in FIG. 4. Here, utility AC power 41 enters enclosure 45 (which can exist as separate enclosures) via connection 441 and is rectified by diode 42, which preferably is a bridge rectifier or active (MOSFET implemented) bridge rectifier. Solar panel DC power 43 enters via connection 443 and passes reverse flow blocking diode 81. At the same time, solar panel DC power from connection 443 passes reverse flow blocking diode 82 into solar only power circuit 86. Circuit 86 monitors power 43 voltage and decreases load to DC power 43 when the solar power 43 voltage drops below a threshold value (which indicates insufficient sunlight to power the solar-only power load).

Portion 87 controls power flow to one or more loads such as water heater 46 connected to output connection 444, and connection 4. Portion 87 turns on power flow (or increases duty cycle of the power) to lower priority load heater 46 when excess solar energy is available. This is achieved by monitoring solar power 43 voltage (or less preferably monitoring increased light from a light sensor) and turning on or increasing duty cycle of the connection to load heater 46 when the voltage is high enough to trigger the threshold. In this way, a higher EROI is achieved by maximally using solar energy as excess solar energy is sopped up by activating lower priority loads. In this case, when high priority loads are fully met, the excess available solar power (detected by a slight increase in solar power voltage to a threshold value or increase in sensed light) is spilled into lower priority appliance(s).

In this optional addition to the scheme shown in FIG. 2, the two reverse flow protection diodes allow the bifurcation of solar only power supply to low priority uses from backed up power supply to high priority loads. Current from backup power 41 cannot pass through the diodes to reach circuits 86 and 87 and cannot supply low priority loads such as heater 46.

In this way, when solar power drops due to sunlight loss, ample power is automatically taken from the utility to maintain constant current supplied to LED light string 30 but is not used for low priority load(s). Feed back circuit 47 with output from sensor 147 continues to adjust current supplied to LED light string 30 according to a threshold value.

Multiple Light Strings Operated by a Common Circuit

FIG. 4 shows a preferred or switchably selected configuration wherein a high solar panel voltage (above 100 volts, preferably above 230 volts) power 43 is connected in parallel with backup power 41, for example batteries or utility power that has been rectified. A small proportion (typically less than 1%) of this high voltage power is converted to a low voltage such as 12v or 15 volts by inverter 49, which powers PWM circuits 47 and 48. Only two PWM circuits, each controlling a string of LED light fixtures are shown for clarity, and a larger number may be used. PWM circuits 47 and 48 work with or incorporate current sensors 147 and 148 respectively. Each current sensor provides a current signal that is used to adjust duty cycle to achieve an average targeted current value for LED light strings 407 and 408, respectively. PWM circuits 47 and 48 control semiconductor switches 149 and 150, respectively. The switches preferably are MOSFETs or IGBT transistors, which switch power to the respective light strings to create the desired PWM duty cycles.

These are high voltage switchers. Preferably for a 100 or 120 volt country such as Japan or the U.S. the LED string voltages are at least 100 or 120 volts, and preferably at least 200 or 240 volts. Where available 380 volts DC is preferred. For other countries such as China, or in Europe, the voltages will be at least 220 volts or preferably at least 440 volts. Because no voltage changes are made and switching speeds are low (below 24 kHz and preferably below 1 kHz) the main source of inefficiency and heat from this switching embodiment is transistor on state resistance loss, which is very low. In fact, in many cases, a heat sink may not be needed due to the low power loss. In experiments with typical 24-48 watt solar panels in strings using IRF740 transistors, simple, aluminum fins connected only to each transistor were used due to the high overall efficiency of the system of at least 99%.

Figure 5:
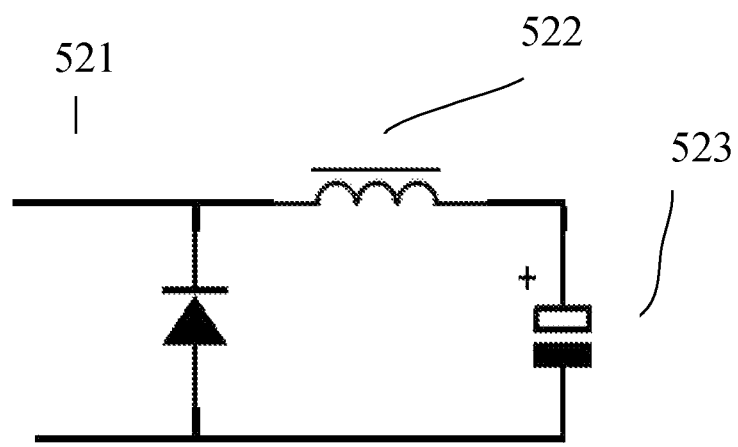
FIG. 5 shows general circuit details for an embodiment.

FIG. 5 shows a basic voltage change circuit combination that preferably is avoided. This circuit accepts pulsed DC voltage wherein diode 521 works with an inductor 522 to collect charge at capacitor 523. The problem with this basic combination is that all current has to pass through inductor 522. This limits maximum current (which saturates the core of inductor 522) and stresses capacitor 523, causing this capacitor to burn out. Preferred embodiments lack capacitor 523 connected to inductor 522 and which integrates pulses from inductor 522.

Example

Figure 6:
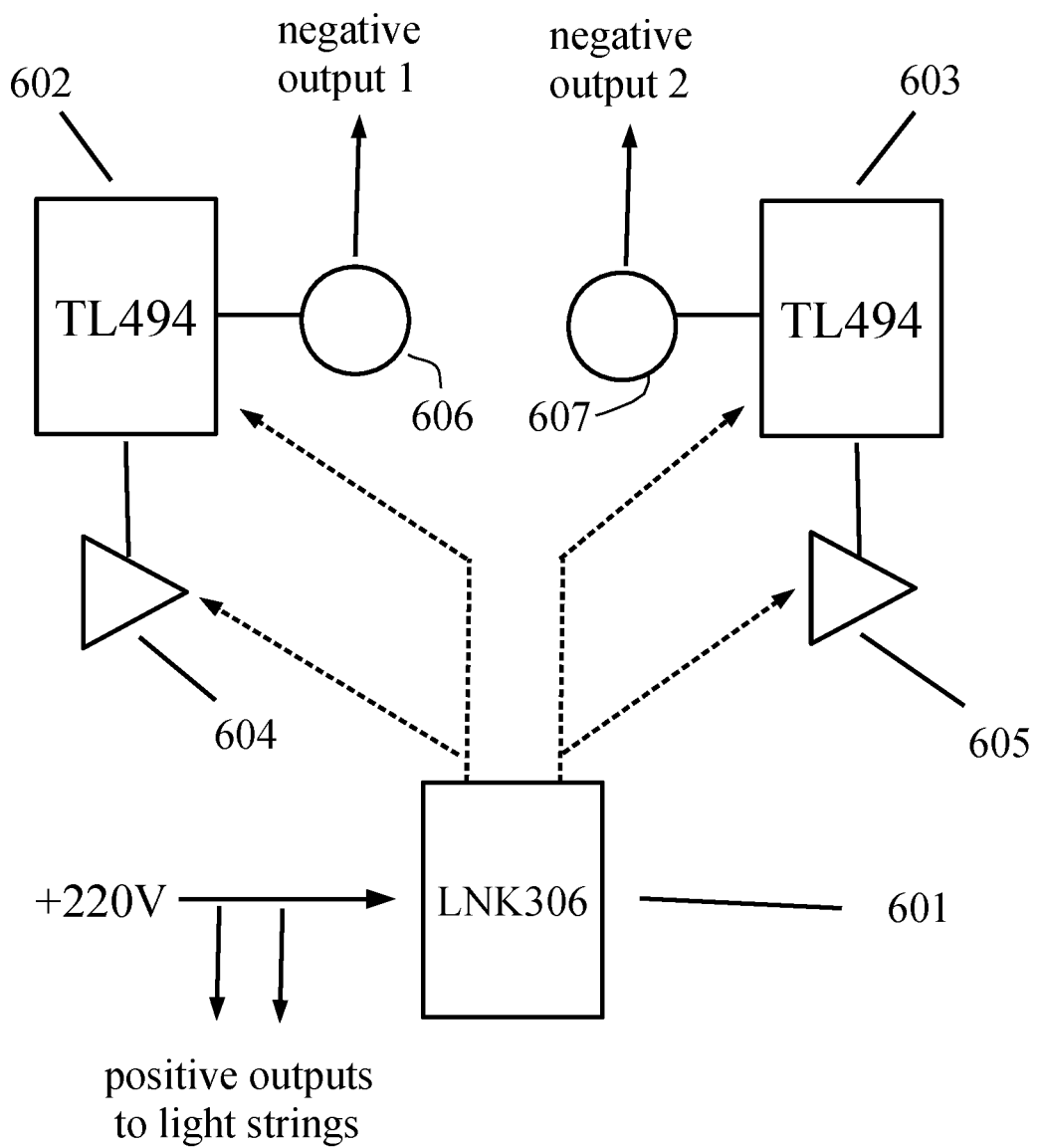
FIG. 6 shows details for a circuit used in an example.

FIG. 6 is a block diagram of a representative circuit that was tested to power one and two short LED light strings at voltages of from 100 to 300 volts. Standard nomenclature for part identification are referred to without trademarks. The LNK306 chip 601 provided approximately one watt of power to the other chips 602, 603 (type TL494) and op amps 604, 605 shown. Op amps 604 and 605 adjust current that flows through transistors 606 and 607. Virtually all of the waste energy from switching in this circuit came from the on resistance (0.55 ohms) of the switched transistors 606 and 607, which were a type IRF740 transistor. At 0.45 amp output at 215 volts and 97% duty cycle, the power supplied to a string of three series connected LED fixtures via this transistor was 94 watts. The loss at the transistor was 0.1 watts and the power supply to the two switching circuits (two strings) consumed about a watt. Thus the overall efficiency of this circuit to supply electrical power from solar or other DC sources to two strings of LED lights is greater than 99%.

Figure 7:
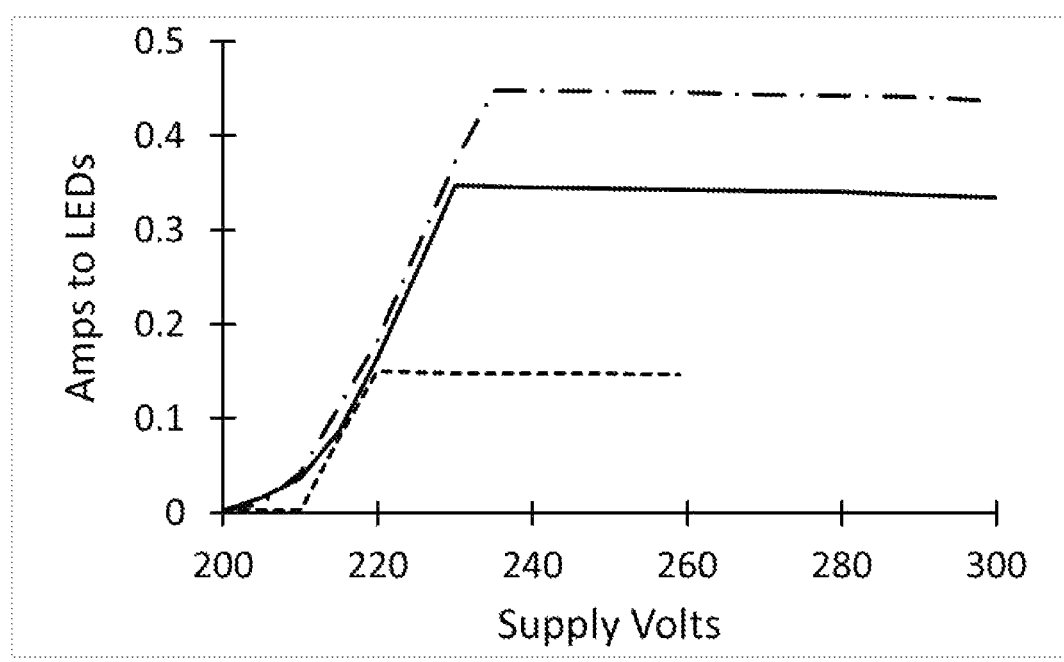
FIG. 7 shows some data obtained from the example.

Results FIG. 7 shows the results of powering 3 series connected ceiling light LED fixtures using supply voltages of between 200 and 300 volts. The current set variable resistor was used to set 0.15 amps, 0.35 amps and 0.45 amps supply to the string. The actual current applied to the string by the circuit, versus input voltage is shown in this figure.

The bottom dashed line plot shows results for the constant 0.15 amp feedback condition. The middle solid line shows results for the 0.35 amp condition and the upper dot dashed line shows results for the 0.45 amp condition. As seen here, supply voltages between 219 volts and 259 volts were regulated well fora constant current of 0.15 amps. Supply voltages between 235 volts and 300 volts were regulated well for a constant current of 0.35 amps. Supply voltages between 235 volts and 300 volts were regulated well for a constant current of 0.45 amps. Higher voltages were not tested due to equipment limitations.

Figure 8:
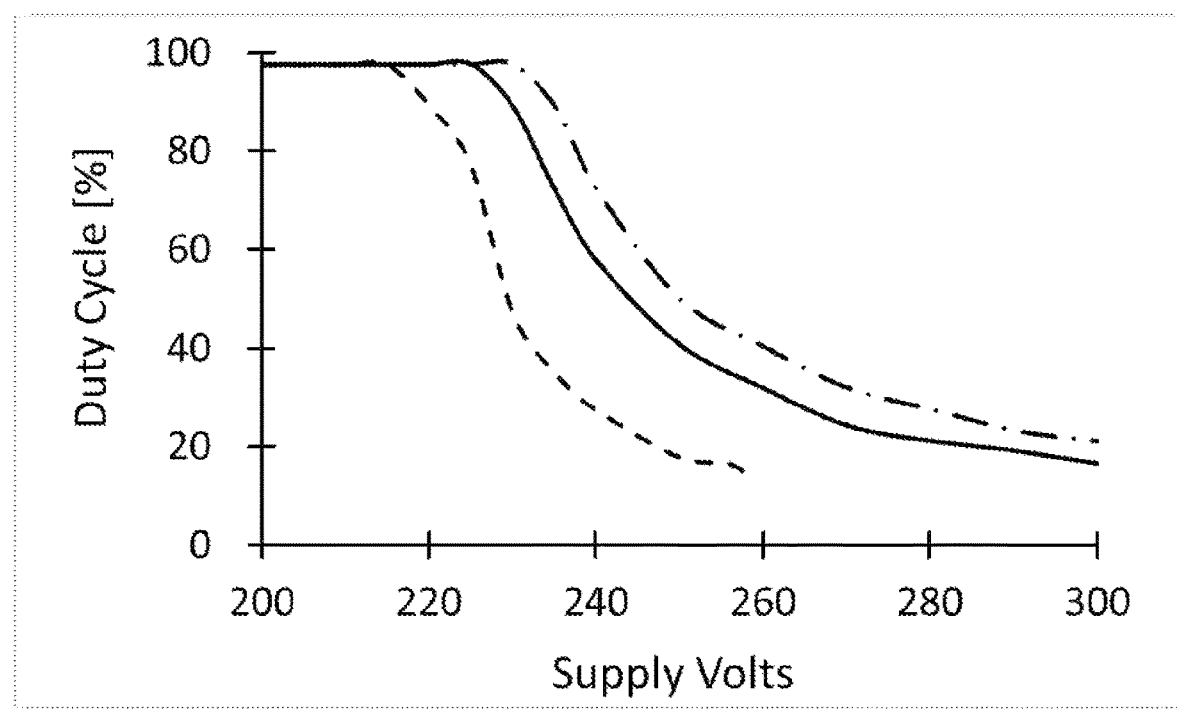
FIG. 8 shows some data obtained from the example.

FIG. 8 shows the duty cycle to output power relationship for the tested string of LED fixtures for these three regulated current conditions. The three lines are identified as described above for FIG. 7. These data indicate that higher voltages could be used with duty cycles within the ambit of the controller, since the smallest duty cycle for the 0.45 amp driven string was 17 percent. In a preferred embodiment, a duty cycle of at least 50% is used to maximize the number of LED lights that can be driven from a single switched output. More preferably the average duty cycle for a series-connected string of LED fixtures is at least 75%.

Optionally Combine with Interrupted DC Technique to Allow Use with Standard Switches and Circuit Breakers, and Thermostats A dimmer may be used to set the output current value lower for lowered light intensity. The dimmer may be incorporated into an on-off switch such as a wall switch.

If using a low cost mechanical switch for turning on/off the lights, preferably the power that flows through this switch is interrupted by at least a 250 hertz rate and more preferably at a dithering rate of at least 250 hertz, in order to protect the switch contacts. In preferred embodiments the current supplied to LED light string 30 is periodically interrupted, PWM driven power with a maximum duty cycle of less than 99.9% and preferably less than 99.5% and running at a frequency of at least 250 hertz. Thus, it is best to place a switch between the PWM switched output and the string of LED fixtures to avoid sparking at switch contacts.

In an embodiment LED light fixtures have high life times because they lack an electrolytic capacitor used for voltage changing.

Other Considerations.

Select or Adjust Solar Power Supply Voltage Slightly Above Final Use Voltage, and Above Optional Utility Backup Voltage.

Preferably, solar power is selected that has an available voltage which is slightly higher (0-5%, 2-10%, 5-20% or more) than that needed to achieve full current output, as exemplified in the horizontal plots in FIG. 7. The solar input voltage under the load should provide less than maximum duty cycle, preferably less than 90% duty cycle, and more preferably less than 80% duty cycle. In this manner, when the solar power drops, the circuit can compensate by increasing duty cycle.

Preferably the Vmax (maximum power point) solar power output voltage supplied is between 0 and 60 volts higher than the series LED voltage. More preferably the Vmax is between 10 and 30 volts higher. This may be seen as wasteful, compared directly to the use of solar energy regulated by an MPPT controller. But, the amount of power consumed by the MPPT controller and by downstream connected inductive voltage changers and DC to AC inverters generally are much higher in sum. More importantly, this potential solar energy can be recovered and used for lower priority loads.

The term "does not pass through a capacitor" means that at least 90%, and preferably at least 99% of the current flow (in amps) through the LEDs has not been pulsed through a current smoothing capacitor or a voltage changing capacitor. Most preferably the only capacitor(s) used is a small capacitor to remove high frequency components. A skilled artisan will appreciate the need for small capacitances to remove high frequency pulses that create radio frequency interference. Preferably a non-electrolytic capacitor such as a 10 nanofarad and/or a 100 nanofarad capacitor is used to treat the power supplied to the LEDs. Preferably the pulsing DC power is not exposed to or smoothed by an electrolytic capacitor.

Figure 1:
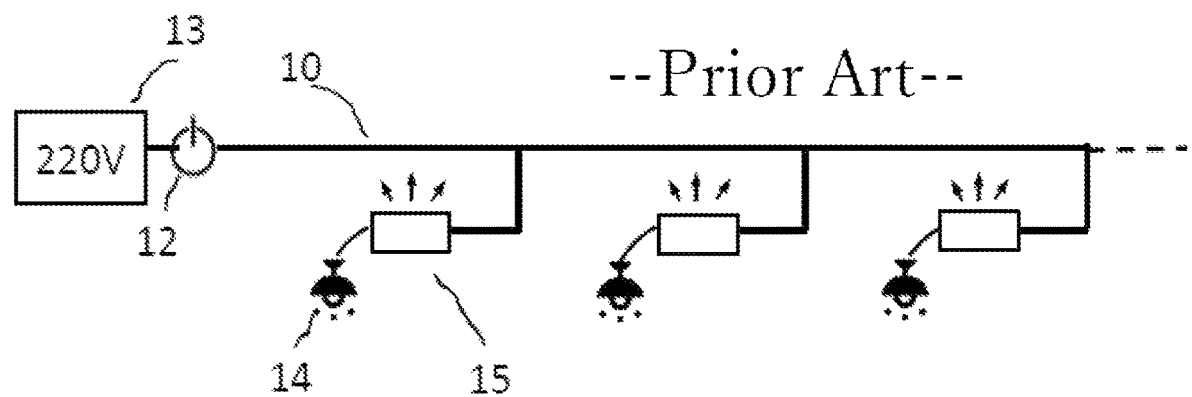
FIG. 1 shows a prior art configuration for connecting LED light fixtures.

Importantly no significant voltage change or control occurs via inductive voltage boosting or bucking. The term "no significant voltage change or control" in this context means that little or no current used by the LEDs passes through a voltage controller. Preferably less than 10% of power, more preferably less than 5% of power and most preferably no power is voltage adjusted by using an inductor based buck, buck boost, or flyback inverter. Much of the power (at least 10%, more often greater than 50% or particularly more than 90%) of the power that passes through the inductor of FIG. 1 (or inductor 522 in FIG. 5) is passed to the connected LED load. The phrase "the power supplied to the multiple light emitting diodes does not pass through an inductor" means that this pulsing technique is not used.

Total use of solar power One technique is to provide solar panels that do not supply all needed power but decrease consumption of utility power by displacing utility power when sunshine permits. For example, a factory that uses 10 kilowatts of electric power at 220 volts can benefit by adding 1 or more kilowatts of solar panels, up to 10 kilowatts to save electricity costs. As long as the Vmax of the connected panels is higher than the utility power (taking into account heating of the panels) then the solar panel power will be preferentially used to near their maximum efficiency, with utility backup that automatically adds when the voltage drops to the utility voltage level. Preferably the utility power is rectified and connected in parallel to make this happen.

Select voltages carefully Select final use voltage that is the same as or slightly lower than optional utility backup voltage, and select/connect solar panels to provide a connected Vmax that is higher than the optional utility backup voltage. In an embodiment utility power backup optionally is used to smoothly provide increasing amounts of power as sunlight dims, and to smoothly provide decreasing backup power as sunlight increases. This is achieved by converting the utility AC power into DC and connecting in parallel to the solar energy input.

By relying on Kirchoffs laws for power sharing, backup and control is achieved without necessarily any specialized chip, hardware or software. The output of the controller preferably provides a set current to a string of LED lighting fixtures connected in series, so that each lighting fixture receives the same current established by the controller. Preferably the current is an average current from a repeated switching by at a switching frequency of at least 200 hertz.

In an embodiment the frequency of switching changes in order to prevent harmonic effects at one frequency, from the attached load. For example, the switching frequency of a PWM controller may be modulated over at least a two fold range and more preferably over at least a 3 fold range.

As an example, solar panels with connected output of Vmax 270 volts (connected in series/parallel to get this optimum power output) may be connected in parallel with a utility power that has been rectified to 240 volts DC. This supplies a string of lights that needs 240 volts for fully outputting the desired current level. As sunlight drops (and/or as power usage from a load increases above what the solar panels can provide), the voltage of the solar electric output decreases. As the voltage reaches 240 volts from the higher voltage on the same load, the connected utility power starts to supply some of the required power. As the solar power gradually goes away completely to 0%, the connected utility power gradually picks up the slack until 100% of the power is supplied by the utility back up.

Solar electric power: This power is mostly (more than 50%) from solar electric such as solar panels connected in series (and/or parallel) to get Vmax (maximum rated power point voltage at 25 degrees C.) higher than the RMS AC backup voltage. For countries with a 220 volt electric grid, preferably the solar input power is 1 to 20 volts higher than 220 volts after accounting for temperature change effects on solar panel voltage. For example, 250 volts of (series connected) panels with −0.4% temperature coefficient will have a voltage output of 225 volts at a solar panel temperature of 50 degrees C. In an embodiment using polycrystalline panels a series Vmax voltage of 275 volts may be used if the panel temperatures may reach 70 degrees. In an embodiment a voltage inverter is used to adjust solar panel output to a more stable voltage.

High EROI Strategies

Another technique for total use of solar power to achieve high EROI is to divert excess solar energy into a heater or other appliance when excess power is available.

Calculations of Energy Return On Investment involve counting up the total costs of employing solar electric over the lifetime of purchased solar panels and dividing the cost benefit (total amount of power obtained times the value of that power) by the total cost. Lower investment is needed because LED light fixtures do not need their own voltage changing circuits or AC to DC changing circuits. Further, solar panels can be added to harvest solar energy without any additional equipment such as a voltage inverter. Higher return comes from greater efficiency of conversion of solar (or other power source) into LED light power. Typically at least 10% improvement can occur. Other improvements come from less replacement of circuit/light costs and the ability to efficiently use excess solar by shunting into lower priority loads, for embodiments that use this option.

In an embodiment shown in FIG. 3, during holidays, weekends and other times when solar electric output exceeds lighting needs, the solar electric power 33 supplies LED lighting to lighting fixtures 34 via circuit 30 but also supplies other lower priority appliances such as water heaters and heat pumps via voltage priority controlled circuit 38.

Circuit 38 has a feed-forward voltage control wherein input voltage from solar panels is sensed and a load (such as a water heater or other appliance) presented to that input is adjusted to prevent solar panel voltage from falling below a threshold voltage. The appliance is of a type that can accept lower power as determined by the feed forward control. This is done by adjusting PWM duty cycle to the connected appliance or otherwise down-controlling the appliance. For example, the compressor of a heat pump can be down-controlled to accommodate lower sunlight by turning down the voltage (for DC compressor) or otherwise shutting it down or otherwise slowing the compressor.

The optional right hand components 82, 86, 87, 4 and 444 of FIG. 4 illustrate another embodiment of combining low priority loads to high priority lighting to increase EROI. Only solar power passes through diode 82 and voltage sensing in circuit 86 determines if excess power is available to activate lower priority appliances connected to outputs 4 and 444. These outputs are interrupted DC powers. As such, water heaters, other heaters including infra red heaters and coffee pots, computers, and cell phone chargers can work on such outlets. During a utility power outage output 4 may be used for cell phone charging or laptop computer use as a secondary function.

When solar panel input voltage is above a threshold, duty cycle is high. Duty cycle decreases as input voltage approaches or reaches a voltage threshold. Preferably the threshold voltage level is above the voltage level of LED lighting circuit 37 of FIG. 3. In this way, all power is provided to the LED circuit(s) as highest priority when not enough power is available to fully service appliances attached to lower priority circuit 38.

In this way, LED lighting has first priority to use any available solar power and lower priority appliances can use the solar power if the lights are not used (or if more than enough power is available for the lights). In practice, when solar energy is in excess, such as during weekends or holidays when LED lights are not needed, the solar energy is used for heating water or other purposes by a circuit that automatically adjusts the load to the solar panels to respect the Vmax condition needed to get maximum efficiency from them, despite cloudy conditions.

In an embodiment, the high voltage DC is interrupted at more than 100 times per second (preferably more than 250 time per second) with less than 3% off time and preferably less than 1% off time. Such interrupted, but nearly pure DC power operates with switches and thermostats without causing damaging large direct current sparks. In fact, at 250 interrupts per second and above, the sparks through circuit breakers and switches were found to be less than from an equivalent voltage and power AC circuit of 60 hertz. This allows further cost savings due to less equipment wear. In another embodiment the LED light string is replaced by a string of heaters, such as infrared heaters or other electric heaters and used as describe herein for LED lighting. A thermostat that controls switching of one or more heaters can be protected by interrupted DC this way.

Low Cost Low Voltage Power Supply

In an embodiment a circuit is interposed between the power source and the LED lighting. The circuit comprises the constant current control circuit and also a low power, low voltage internal power supply that supplies power to run the constant current control circuit. In a preferred embodiment the internal power supply can operate from an input voltage of between 80 volts and 260 volts. The internal power supply preferably consumes less than 1 watt and may have a buck controller within it.

Figure 9:
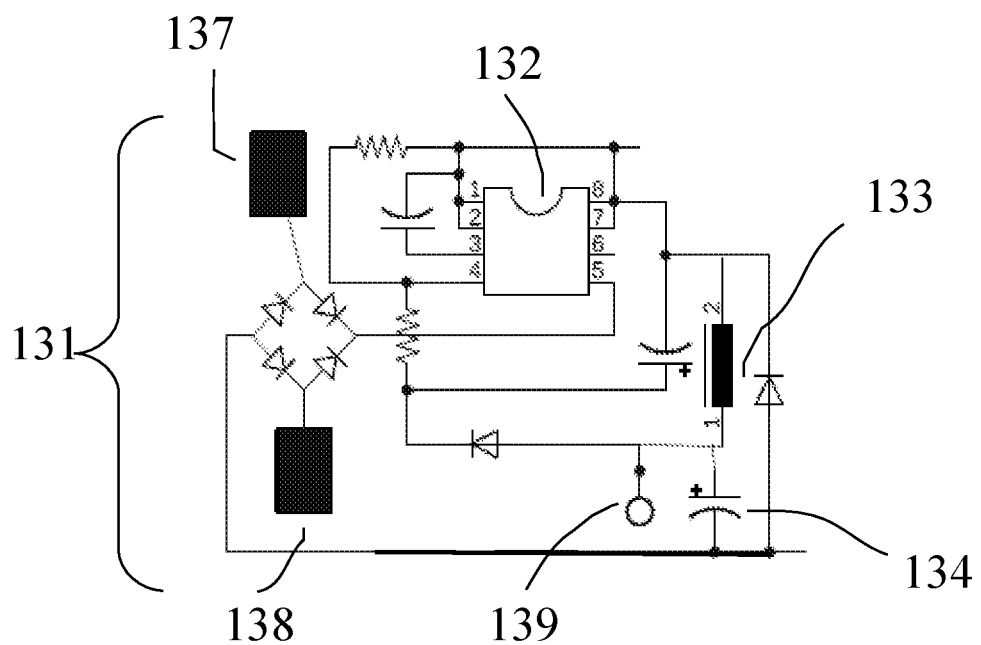
FIG. 9 shows general circuit details for an embodiment.
Figure 9:
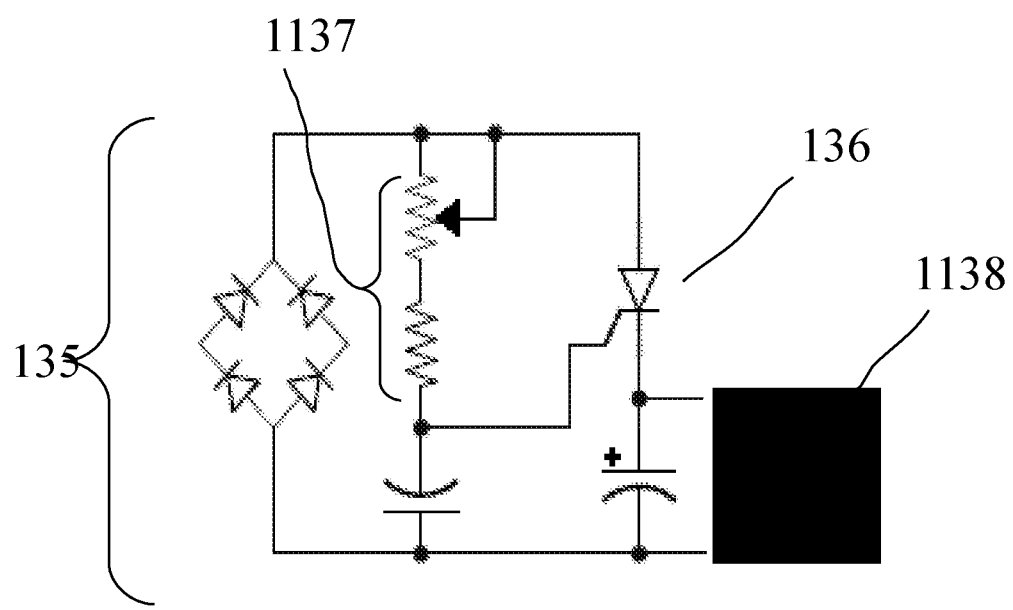

Examples of low voltage internal power supplies are shown in FIG. 9. Circuit 131 comprises a buck boost or flyback controller chip 132 (eg. LNK306) and is representative of low power buck inverters that contain a switched MOSFET, an outboard inductor 133 and capacitor 134. This converts a DC power from rectifier outputs obtained from AC inputs 137 and 138. The positive rectified output connects to the light, and the negative power side is switched by a constant current controller (shown as 141 in FIG. 10). Low voltage output 139 (typically between 5 and 14 volts) powers the constant current controller circuit. A cheaper embodiment shown as circuit 135 uses a silicon controlled rectifier 136 with adjustable phase trigger 137 section connected to a voltage regulator 138 section, which can be as simple as a zener diode and lacks an inductor.

The low voltage power supply preferably consumes less than 1% of the total power consumed and more preferably less than 0.5%. The constant current control circuit powered by the low voltage power supply may be adjusted to control a desired averaged constant current set during manufacture or upon installation. In an embodiment, a user can adjust this constant current value to adjust light dimness.

Figure 10:
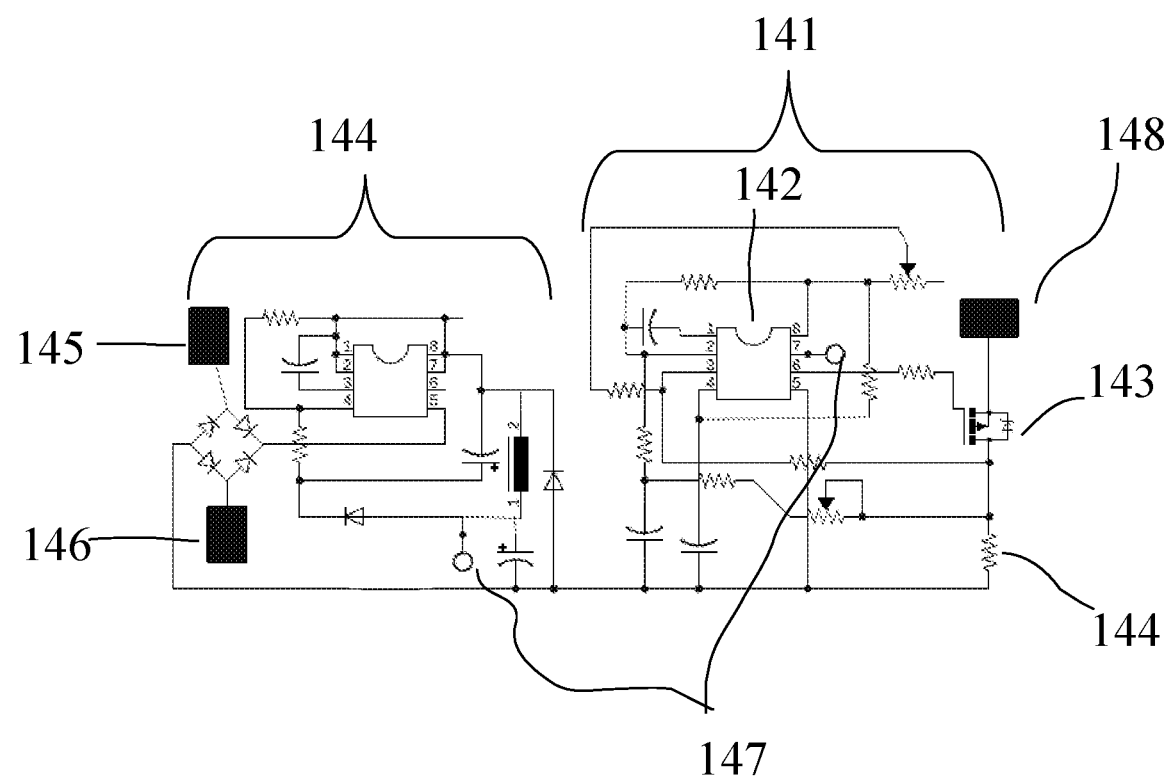
FIG. 10 shows general circuit details for an embodiment.

FIG. 10 shows a representative circuit that combines the low voltage power supply 144 from FIG. 9 with a constant current PWM controller circuit 141. AC power input to connectors 145 and 146 is used to make low power output 147 that energizes a PWM controller 142, which modulates duty cycle of switch 143, as determined by adjustable current feedback from series resistor 144. In a preferred low cost embodiment circuit 141 is replaced with a inductor-less circuit such as 135 from FIG. 9, and preferably chip 142 is replaced by a lower cost device such as a 555 timer in a PWM configuration or a dedicated microprocessor device.

Combination with Solar Electric.

A particularly unique and unexpected advantage of the circuits, apparatuses and methods described herein is the ease and high efficiency for adding solar electric energy. It was found by experimentation that electricity generated by solar panels at low level light (7% of full sun conditions) could be used to power LED light fixtures at high (more than 90%) efficiency, (with the remainder supplied by rectified utility backup power). The maximum power output voltage of the solar panels (connected in series) had to be higher than the RMS voltage of the parallel connected utility backup power. The utility backup power is rectified by (for example) a bridge rectifier and the DC output from the utility could be directly connected in parallel with the solar panels. It was found that a blocking diode from the panels was needed for highest efficiency. Also a large polarized (DC) capacitor was needed on the solar panel output for high efficiency. For a nominal (full sun rating maximum power) 8 ampere circuit, preferably the capacitor is at least 50 uF, more preferably at least 100 uF. In an embodiment the capacitor is at least 470 uF. Because the power is not pulsed at high frequency (preferably not over 1 kilohertz), a normal large electrolytic capacitor is recommended for good reliability.

Application of No-Inductor Technique to Other Appliances

The advantages of lower cost and efficiency were discovered by applying the no-inductor technique to powering refrigerators and heat pumps. It was surprisingly discovered that converting a direct current into square wave direct current without voltage change provided less inverter power loss and with no perceptible increase in appliance current draw. In a preferred embodiment the refrigerator has a vacuum pump rated at a higher power than the size of refrigerator used. Small 50-60 watt refrigerators were found to use the same 150 watt compressors as that used by big refrigerators and had no problem handling the square wave. Moreover this combination allowed use of a cheaper high voltage direct current capacitor (preferably at least 100 uF more preferably at least 470 uF, yet more preferably at least 1000 uF) at the direct current input end. This allowed the small inverter to handle large starting load pulses simply without being limited by the current handling capacity of the voltage changer. Normally DC to AC inverters are current limited by the voltage change circuitry due to inductor saturation. This also allowed 100 percent solar powered because the electrolytic capacitor supplied the high current pulse needed to start the motor. In an embodiment the refrigerator creates ice when solar power is available and relies on that ice at night to keep cool.

An embodiment provides a solar energy powered icebox, comprising a converter that electrically connects solar power DC to a refrigerator and that converts the solar power DC into AC power without passing the solar power through an inductor and without boosting or bucking the DC voltage, a refrigerator with a freezer compartment having a powered cooler in contact with the freezer compartment and which cools the freezer compartment, and a large container of w, ater inside the freezer compartment, wherein the large container of water occupies more than half of the volume of the freezer compartment and freezes in response to activation of the powered cooler with solar electric power having a voltage at substantially the same level as the source of DC.

In an embodiment the solar energy powered icebox lacks an inductor between the source of DC and the powered cooler. In an embodiment the converter comprises a polarized DC capacitor of at least 100 microfarad electrically connected to DC input power. In an embodiment the converter comprises a square wave DC to AC inverter.

In an embodiment the converter comprises a sine wave DC to AC inverter that operates by phase width modulation switching of a DC input power having a voltage of that is higher than the root-mean-square voltage of the AC output voltage. In this case the converter preferably accepts a solar powered DC input voltage of between 1.2 and 1.75 times the output AC root-mean-square voltage. 26. The solar energy powered icebox of claim 23, wherein the DC to AC inverter comprises a polarized DC capacitor on a first output leg of an H bridge and a polarized DC capacitor on another output leg of opposite polarity to the first output leg of an H bridge and wherein the polarized capacitors absorb high frequency energy.

In an embodiment the refrigerator comprises a fan inside that circulates air against a freezer compartment when solar power is not available to operate the powered cooler.

Heat pumps were successfully operated with an inductorless system. By automatically turning off the compressor during shady times a heat pump could be connected directly to solar panels without a power storage. In an embodiment a solar powered heat pump is provided wherein a direct current (DC) electric power source connects to an electric compressor motor powered heat pump without passing the electric power through an inductor, comprising: a power input that accommodates a DC power source of a high voltage suitable for a heat pump; a DC to AC inverter that lacks an inductor for buck or boost change in voltage supplied to the heat pump; and a control circuit that monitors strength of the solar electric power input, wherein the DC power source voltage is within 30 percent of the voltage rating of the heat pump and the control circuit decreases the heat pump compressor power in response to a decrease in available solar power.

In an embodiment the control circuit directs the heat pump compressor to shut off in response to a DC power source voltage that falls below a threshold value. In an embodiment the electric compressor of the heat pump comprises a DC motor. In an embodiment the heat pump converter further comprises an electric input connection to a temperature sensor circuit in the heat pump or controller of the heat pump, and a circuit that alters the temperature sensor circuit. In an embodiment the temperature sensor circuit comprises a thermistor of negative temperature coefficient and wherein a resistance is added or removed from this circuit to indicate a different temperature based on available power from the DC power source.

In an embodiment the solar powered heat pump converter further comprises an electric connection to a control circuit within the heat pump, wherein a decrease in available power from the DC power source causes a signal that is electrically communicated to the control circuit within the heat pump, and decreases or turns off power to the electric compressor of the heat pump.

Automatic Bypass Option

When one member of a series connected string of lights (or other electrical loads) burns out, the circuit is interrupted and the other electrical devices lose power as well. This problem was alleviated by the surprisingly discovered scheme wherein a high voltage triggered device automatically shorts out (destroys) a semiconductor or triggers a latching SCR upon detection of the member burn out. The semiconductor is connected in parallel with the burned out member and becomes a short soon after the member has burned out and became an open circuit. This maintains the same current flow to the remaining series connected members. In the SCR latching embodiment an SCR connected in parallel with the burned out member is triggered and stays on as long as current flows through the remaining series connected members.

Figure 11:
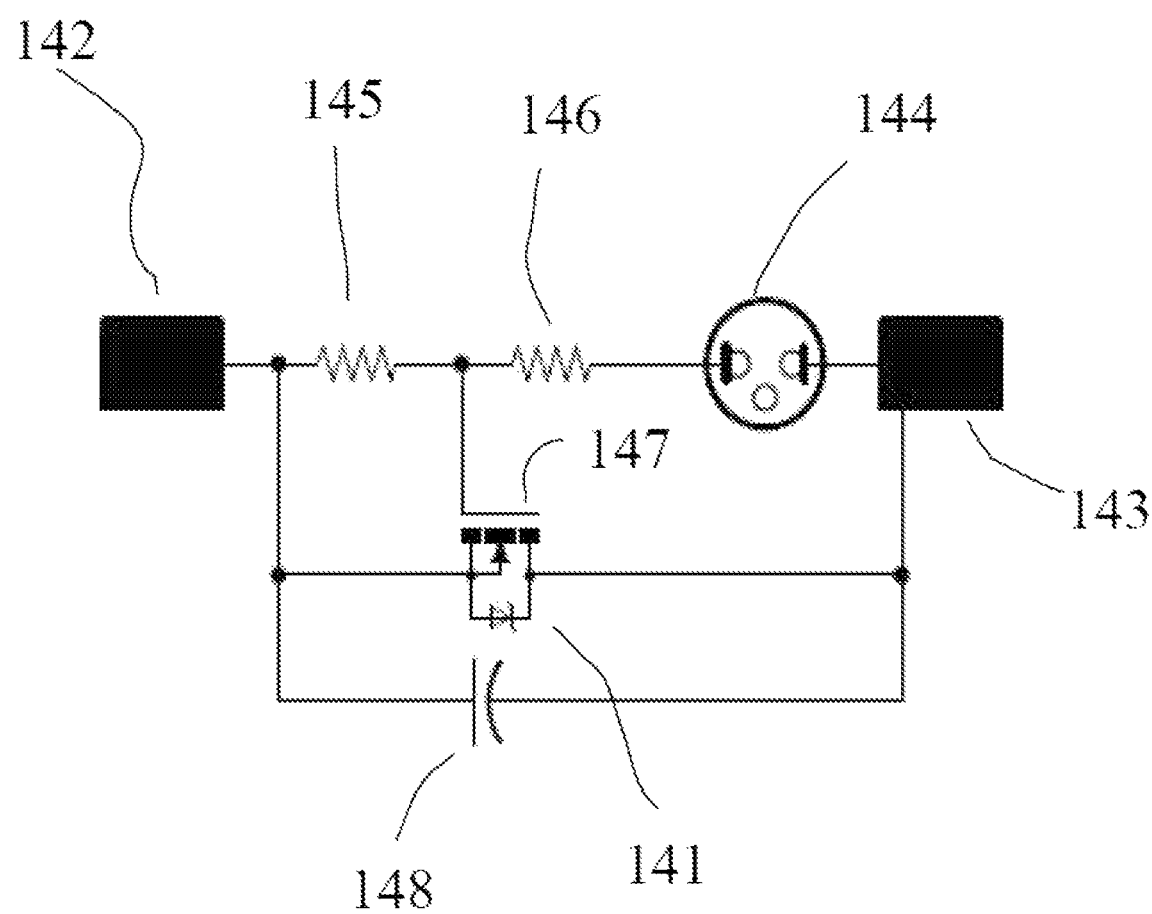
FIG. 11 shows general circuit details for an embodiment.

FIG. 11 shows N-MOSFET semiconductor 141 connected between the negative side 142 and positive side 143, respectively of a member of a string (not shown). Neon bulb 144 is a high voltage triggered device that passes a high voltage to gate 147 of MOSFET 141 via resistor bridge 145 and 146.

The semiconductor that shorts out may be for example a valve such as a MOSFET (shown here and preferred), IGBT, bipolar transistor or a diode. The semiconductor could also be a diode junction, MOSFET junction or other junction within a chip such as a 555 timer chip or dedicated microprocessor chip.

The high voltage triggered device electrically sends a destructive high voltage (above the rated voltage of the semiconductor junction) to the semiconductor when the threshold of the high voltage triggered device is exceeded. For example the neon bulb 144 of FIG. 11 typically has a conductivity threshold of about 70-85 volts. During normal operation with a light fixture in a string, bulb 144 has only a 50 volt or less voltage drop. Such voltage is insufficient to ionize the neon and cause conduction between parallel connections 142 and 143 of the attached light. However, if the voltage drop between connections 142 and 143 goes over 80 volts (because the light or other attached device has burned out and became an open circuit) then the neon bulb 144 conducts and forces a high voltage at gate 147 of MOSET 141.

Gate 147 of N-MOSFET 141 has a maximum gate to source voltage rating of typically less than 20 volts. When neon bulb 144 turns on, the voltage on the gate is higher than 20 volts with respect to input point 142 and preferably is at least twice the maximum gate to source voltage rating. As a result the MOSFET burns out by forming a short between source and drain electrodes. A MOSFET connected this way in parallel to the series connected device will maintain the constant current flow through the light fixture shortly after the device burns out (and no longer causes a lower magnitude voltage drop between terminals 142 and 143). One or more resistors 145 and/or 146 are preferred to limit current flow thought the neon bulb. Capacitor 148 may be used or in series with a resistor to prevent premature activation.

A preferred embodiment of the "high voltage triggered device" is a part with enhanced conductivity in response to sensing an increased voltage. Examples include zener diodes, varicaps and neon (or other gaseous) bulbs. In another embodiment the high voltage triggered device is a voltage comparator circuit having an output voltage that is sufficient to short out a semiconductor junction.

Experimental results showed that most semiconductor junctions will burn out into a short and conduct current if destroyed by too high a voltage. Gates of power MOSFETS could routinely turn the MOSFET into a short from source to drain upon exposure to small currents (eg. 1 milliamp or more) of high voltage (example twice the rated voltage or more) between gate to source. MOSFETS are particularly useful because a burned out MOSFET has very low resistance, is designed to carry high power and can be simply wired in parallel to a device that uses direct current without conduction in the normal state.

An electrical engineer with a year of analog electronics experience can easily derive additional and alternative circuits using other voltage triggers such as a zener diode (can be connected in a similar manner to that of the neon bulb) a varicap, or even a voltage comparator.

A silicon controlled rectifier ("SCR") may be used by connecting in parallel with the series connected device. The anode of the SCR can be connected to the plus side terminal of the load and the cathode to the negative side terminal of the load (connectors 143 and 142 of FIG. 11). The gate of the SCR is controlled by a voltage that corresponds with (increases and decreases with) the voltage (such as between terminals 142 and 143 of FIG. 11). For example, a resistor chain between terminals 142 and 143 may be chosen to provide a lower than trigger voltage when the series connected device is conducting, but a higher than trigger voltage when the load becomes an open, or high resistance, which forces a trigger voltage on the SCR gate. A trigger voltage at the gate causes the SCR to conduct between the terminals until the power is turned off.

Other Devices

Manufacturing, assembly lines often have multiple devices that optimally connect to a common circuit. For example, multiple small heaters may be arranged along a production line. Multiple induction heaters, infrared heaters, ultraviolet catalyzers, multiple pumps, fans and the like may be operated together. In many cases, each device may be a lower voltage device that connects to a higher factory supplied voltage. Connecting these in series saves money and complexity. By using an automatic bypass device as described herein a single device in a series can burn out without having to immediately shut down the line. In an embodiment, a visual signal such as a LED which only shines when the device junction is shorted, is activated to show the operator that a particular device has burned out.

Although this specification references exemplary embodiments and the accompanying drawings, the disclosure is not limited thereto. The embodiments may be variously modified and altered by those skilled in the art to which the disclosure pertains without departing from the spirit and scope of the disclosure. Therefore, exemplary embodiments are provided to explain the spirit and scope of the present disclosure, but not to limit them, so that the spirit and scope of the present disclosure is not limited by the embodiments. The scope of this disclosure should be construed on the basis of the accompanying claims, and all the technical ideas within the scope equivalent to the claims are included in the scope of the disclosure.

The invention claimed is:

1. An electrical apparatus that powers a string of series-connected light emitting diode (LED) light fixtures from a power source without changing voltage, comprising:
   an input that can accept the power source of at least 100 volts DC or 100 volts root-mean-square AC;
   an output that connects to a load comprising a series string of LED lights having a voltage up to 50% higher than that needed to power the string of series LED lights;
   a semiconductor switch that interrupts current between the input and the load;
   a current sensor that senses an average pulsed current to the load and outputs a signal;
   a pulse width modulation (PWM) controller that responds to the signal from the current sensor and modulates the average current by modulating the duty cycle of the semiconductor switch for supplying current to the series string of LED lights,
   wherein the electrical apparatus does not change voltage to the LED light fixtures.

2. The electrical apparatus of claim 1, wherein the PWM controller provides a duty cycle to the semiconductor switch of at least 17-97 percent to cover an input voltage that is at least 20% higher than the voltage needed by the series string of LED lights.

3. The electrical apparatus of claim 1, comprising
   at least two semiconductor switches that interrupt current between the input and at least two respective loads;
   one or more current sensors that senses an average current to the load for each of the respective semiconductor switches;
   and the PWM controller that responds to the signal from the one or more current sensors and modulates the average current for each of the respective semiconductor switches.

4. The electrical apparatus of claim 1, wherein the power source comprises a solar electric power source and a backup power source connected in parallel such that when the solar electric power source is insufficient to power the LED light fixtures, the backup power supplants the power without a voltage changer.

5. The electrical apparatus of claim 4, wherein the backup power is an AC power having a root mean square voltage that is at least 2 volts lower than a maximum power point (Vmax) voltage of a solar power.

6. The electrical apparatus of claim 1, further comprising a lower priority semiconductor switch to another load that consumes unused solar energy when lights are off or the lights cannot consume all of the available solar energy.

7. The electrical apparatus of claim 6, further comprising a feed-forward voltage control that monitors the solar power source voltage and limits loading of the solar power source voltage below a threshold value.

8. The electrical apparatus of claim 1, wherein the electrical apparatus comprises a first input for a solar electric power source and a second input for a second alternating power source connected in parallel such that when the solar electric power source is insufficient to power the LED light fixtures, the second alternating power source supplants the power without a voltage changer.

9. A string of LED lights that is powered by the electrical apparatus of claim 1, wherein each LED light of the string of LED lights comprises a power input connected in series with the other LED lights, and each LED light further comprises a bypass circuit connected in parallel with the power input and that keeps the string of lights powered when the connected LED light burns out.

10. The string of LED lights as described in claim 9, wherein the bypass circuit comprises:
   a voltage sensor that outputs a signal upon detection of a high voltage across the power input of the LED light after the LED light is burned out; and
   a semiconductor that receives the signal from the voltage sensor and that burns out a junction in response, thereby causing a short across the power input.

11. The string of LED lights as described in claim 10, wherein the voltage sensor is a zener diode.

12. The string of LED lights as described in claim 10, wherein the semiconductor is a MOSFET.

13. The string of LED lights as described in claim 12, wherein the semiconductor is an N-MOSFET with drain connected to the plus side of the light power connection and with source connected to the negative side of the light power connection.

14. An electrical apparatus that merges DC power from solar panels with back up power to provide power to a load, comprising:
   an input that accepts DC power from the connected solar panels that has a voltage output up to 50% higher than that needed to power the load;
   an input that accepts backup electrical power that is at least 2 volts lower than a maximum power point (Vmax) of the connected solar panels;
   an output that connects to the load;
   a semiconductor switch that interrupts current between the input and the load;
   a current sensor that senses an average pulsed current to the load and outputs a signal; and
   a pulse width modulation (PWM) controller that responds to the signal from the current sensor and modulates the average current by modulating the duty cycle of the semiconductor switch for supplying current to the series string of LED lights,
   wherein the electrical apparatus does not change voltage to the load and wherein the solar panels and backup power smoothly cooperate to provide power to the load via their parallel connection.

15. The electrical apparatus of claim 14, wherein the load comprises multiple series connected heaters.

16. A light that is connected within a series connected set of lights to the electrical apparatus of claim 14, comprising:
   a power input with light emitting diodes (LEDs) connected thereto; and
   a bypass circuit connected in parallel with the power input, and configured so that when the LEDs connected to the power input burn out and form an open circuit, the bypass circuit shorts the power input, allowing power to flow in the series string LED light fixtures.

17. The light of claim 16, wherein the bypass circuit comprises:
   a voltage sensor that outputs a signal in response to a high voltage detected at the light power input; and
   a semiconductor that shorts out in response to receipt of the signal from the voltage sensor.

18. The light of claim 17, wherein the voltage sensor is a zener diode and the semiconductor is a transistor.

19. The light of claim 18, wherein the semiconductor is an N-MOSFET transistor with its drain connected to the positive input side of the power connection and its source connected to the negative input side of the power connection.

* * * * *